United States Patent

[11] 3,561,799

| [72] | Inventor | Francis M. Hutchinson<br>141 Springer Road Box 83, Fairfield, Conn. 06430 |
|---|---|---|
| [21] | Appl. No. | 849,697 |
| [22] | Filed | Aug. 13, 1969 |
| [45] | Patented | Feb. 9, 1971 |

[54] DETENT FASTENER
12 Claims, 5 Drawing Figs.

[52] U.S. Cl. .................................................. 287/52.05,
85/8.1; 151/8
[51] Int. Cl. ........................................................ F16d 1/06
[50] Field of Search ........................................... 287/52.05,
53TK, 53LK, 52.07, 52.08, 53H; 85/8.1, 8.3;
151/8, 6; 279/79

[56] References Cited
UNITED STATES PATENTS

| 838,734 | 12/1906 | Moler | 151/8 |
|---|---|---|---|
| 1,261,646 | 4/1918 | Taber | 151/8 |
| 2,162,811 | 6/1939 | Guy | 85/8.3 |
| 2,336,325 | 12/1943 | Weber | 279/79X |
| 2,945,712 | 7/1960 | Lewis | 287/53H |
| 3,388,934 | 6/1968 | Chapman, Jr. et al. | 287/52.07X |

FOREIGN PATENTS

| 1,420,242 | 10/1965 | France | 287/52.05 |

*Primary Examiner*—David J. Williamowsky
*Assistant Examiner*—Andrew V. Kundrat
*Attorney*—Mattern, Ware and Davis

ABSTRACT: A detent fastener for releasably holding together two structural parts, such as spindle and a wheel member mounted thereon having a hub provided with an axial spindle-receiving opening. The fastener comprises a generally U-shaped spring wire clip for interlocking engagement in grooves provided in the axial opening and sides of the wheel hub, and includes a yieldable spring-loaded detent pin portion for releasable snap engagement in a transverse diametric hole provided in the spindle, whereby the wheel member is held against both axial and rotational movement relative to the spindle. Means is provided for manually retracting the detent pin portion from the spindle hole without the use of tools to enable removal of the wheel member from the spindle.

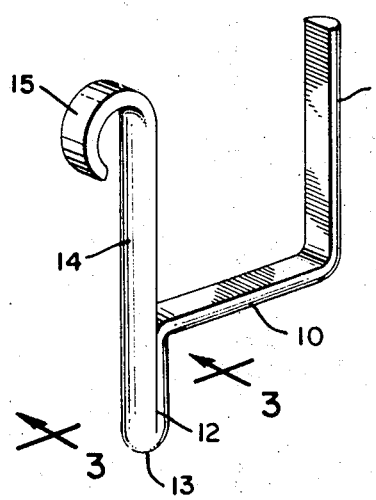

3,561,799

DETENT FASTENER

The present invention relates to a detent fastener for releasably holding together two structural parts such as a spindle and a wheel member having a hub provided with an axial spindle-receiving opening, a particular example being in the grinding and polishing art where different wheels, pulleys, and the like must be repeatedly removed from and mounted upon a motor driven shaft or spindle, heretofore by the manipulation of setscrews, nuts and the like, requiring the use of a screwdriver, wrench, or similar tool.

An object of the invention is to provide as one embodiment of the invention a detent fastener adapted to be carried in interlocking relation upon a wheel, pulley or the like and including a detent pin portion for releasable snap engagement in a transverse diametric hole in a spindle or the like to connect the wheel and spindle against relative axial and rotational movement, and which may be quickly and easily retracted manually without the use of tools.

Another object is to provide a detent fastener which may be economically formed from a length of spring wire.

A further object is to provide a detent fastener formed from a length of spring wire of semicylindrical cross section, whereby bending such wire upon itself will produce a detent pin portion of cylindrical shape for better fitting engagement in the transverse hole of the spindle, such semicylindrical wire having the further advantages of easy flexing relative to its flat side, as well as facilitating the interlocking engagement of the fastener in flat bottomed grooves provided in the member with which the fastener is interlocked.

With the above and other objects in view preferred and satisfactory embodiments of the invention will be described hereafter in greater detail with reference to the accompanying drawings in which:

FIG. 1 is a perspective view of a detent fastener according to one exemplary embodiment of the invention;

FIG. 2 is a view, partially in elevation and partially in section, showing the fastener illustrated in FIG. 1 in its cooperative connecting relation with a wheel or pulley hub and a spindle;

FIG. 3 is a sectional view of the detent pin portion of the fastener taken along the line 3—3 of FIG. 1;

FIG. 4 is a top plan view of the wheel and spindle as shown in FIG. 2 showing the detent fastener in section taken along the line 4—4 of FIG. 2; and FIG. 5 is a view similar to FIG. 2 on a smaller scale showing a modified embodiment of the detent fastener provided with a pair of detent pin portions engaged in a pair of transverse holes in the spindle.

Referring to the drawings, and more particularly to FIG. 1, the detent fastener, according to the exemplary embodiment of the invention illustrated therein, is in the form of a generally U-shaped spring clip formed by bending from a length of spring wire of semicylindrical cross section, and comprises a horizontally extending transverse bight portion 10 having the flat side of the wire disposed upwardly, a vertically extending leg portion 11 bent upwardly from one end of the bight portion 10 with the flat side of the wire inwardly. A vertical downwardly extending detent pin portion 12 at the opposite end of the bight portion 10 from the leg 11 is formed by bending it upwardly upon itself, so that the two engaged semicylindrical pin forming portions of the wire provide a detent pin of cylindrical cross section as shown in FIG. 3 having a substantially semispherical lower end portion 13 formed by the fold or bight of the wire which, as will hereinafter more fully appear, provides a smoothly rounded pilot end upon the pin portion to facilitate its entrance into a detent pin receiving hole or the like.

The upwardly bent part of the detent pin portion is extended upwardly above the end of the bight portion 10 to provide an upwardly extending vertical leg portion 14 in laterally spaced parallel relation to the leg portion 11 to form with the bight portion 10 and the leg portion 11 the generally U-shape of the clip. The leg 14 also provides a means for exerting an upward retracting or pulling force upon the detent pin portion, as well as an upward resilient flexing force upon the bight portion 10 in its releasing operation in its assembled relation to a wheel member and spindle, as will presently more fully appear, and for this purpose there is provided at the upper end of the leg portion 14 an outwardly and downwardly curved fingergrip portion 15 which may be conveniently gripped by the fingers for the purpose of manually exerting an upward pull upon the leg portion 14.

In FIGS. 2 and 4 the detent fastener is shown in its cooperative relation with a wheellike member mounted upon a spindle. The wheellike member 16 is provided with a hub 17 having an axial passage 18 in which the spindle 19 is engaged and is provided with flat side surfaces 20 and 21 at the respective ends of the passage 18. An axially extending flat bottomed groove 22 is provided in the wall of the passage 18 and flat bottomed grooves 23 and 24 are respectively provided in the end surfaces 20 and 21 in radially extending relation to the ends of the groove 22, thus providing a substantially U-shaped groove formation for receiving the generally U-shaped detent fastener in interlocked relation. The bight portion 10 of the fastener is received in the groove 22 and the leg portions 14 and 11 are respectively received in the grooves 23 and 24, the fastener being thus firmly positioned by virtue of the engagement of the flat surfaces of the fastener with the flat bottoms of the grooves, as well as by the fact that the grooves are of a width substantially corresponding to the width of the wire forming the fastener.

The end portion of the groove 22 adjacent the end side surface 20 is curved upwardly as at 25 so that its flat bottom surface merges with the flat bottom surface of the groove 23, thus providing a clearance space 26 upwardly opposed to the detent pin portion 12 of the fastener to permit upward flexing of the bight portion 10 of the fastener and upward retraction of the detent pin portion 12 of the fastener from a transverse diametric cylindrical hole 27 provided in the spindle 19 in which the detent pin portion of the fastener is adapted to engage, whereby the fastener in its interlocked relation with the wheel member connects the wheel member to the spindle and secures it against relative axial and rotational movement.

In connecting the detent fastener to the wheel member the leg portion 14 is first inserted into the passage 18 with the curved finger grip end portion 15 disposed in the groove 22, the end portion 15 thereupon riding upwardly upon the curved surface 25 which acts as a camming wedge to slightly spread the legs of the fastener so that they yield outwardly and thereupon engage in the radial grooves 23 and 24 and are firmly retained therein under tension of the slightly flexed fastener.

In engaging the wheel member upon the spindle with the fastener firmly interlocked with the wheel hub, the detent pin portion is first pulled upwardly by means of the fingergrip portion 15 of the leg portion 14, so that the rounded end of the detent pin portion will clear the spindle-receiving passage 18 thus enabling the wheel member to have its spindle-receiving passage 18 engaged over the end of the spindle. Thereupon the wheel member is slidably moved along the spindle to the point where the detent pin portion of the fastener has snap engagement with the hole 27 of the spindle. In order to remove the wheel member from the spindle the detent pin portion is adapted to be retracted from the hole 27 of the spindle by manually pulling upwardly upon the leg 14 of the fastener, this operation being facilitated by the fingergrip end portion 15 of the leg. At the point where the detent pin portion clears the hole 27 the wheel member may be readily slid axially of the spindle and removed therefrom.

In FIG. 5 there is illustrated a modified embodiment of the invention in which the fastener is provided with a pair of detent pin portions 12 and 12', the leg 11 of the fastener being extended upwardly from the detent pin portion 12' in the same manner as the leg 14 is extended upwardly from the detent pin portion 12. A finger grip portion 15' is provided at the upper end of the leg 11. For the purpose of accommodating this modified fastener, the groove 22 of the axial hub passage 18 is provided with upwardly curved end portions 25 and 25′ merging with the radial grooves 23 and 24, and the spindle 19 is provided with a pair of transverse diametric detent pin receiving holes 27 and 27′.

I claim:

1. A detent fastener, for releasably holding a wheellike member upon a spindle, said member having a hub provided with an axial spindle-receiving passage and side surfaces at the ends of said passage, and said spindle having a detent-receiving formation, said fastener comprising a formed spring wire clip of generally U-shap including a bight portion for engagement with the wall of said hub passage, a pair of leg portions for engagement with said hub side surfaces, and a detent pin portion for engagement in said detent-receiving formation of said spindle, one said leg portion being bent upwardly in vertically extending relation from one end of said bight portion, said pin portion comprising a first part bent downwardly from the other end of said bight portion and a second part bent vertically upward from and upon said first part, and the other said leg portion being a vertical upward extension of said second part of said detent pin portion, and a finger grip means comprising an outwardly and downwardly bent extension of the upper end of the other said leg portion.

2. A detent fastener according to claim 1 wherein said clip is a length of wire of noncircular cross section and flat at one side.

3. A detent fastener according to claim 2 wherein said length of wire has a flat side coinciding with the diameter of a circle and a rounded side coinciding with a half circle.

4. A detent fastener according to claim 2 wherein the flat side of said bight is upwardly disposed, the flat sides of said leg portions are inwardly disposed and the flat sides of said detent forming first and second parts are in contact with each other.

5. The combination of a wheel member, a spindle, and a detent fastener releasably fastening said wheel member and spindle together, said wheel member having a hub provided with an axial spindle-receiving passage and side surfaces at the ends of said passage, said spindle having a detent receiving formation, and said fastener comprising a formed spring wire clip of generally U-shape including a bight portion for engagement with the wall of said hub passage, a pair of leg portions for engagement with said hub side surfaces, and a detent pin portion for engagement in said detent receiving formation of said spindle, there being a groove extending axially of said hub passage for receiving the bight of said fastener, and radial grooves in said hub side surfaces extending from the ends of said axial passage for receiving the legs of said fastener, and there being a clearance space between said axial groove and said detent-receiving formation to permit flexing of said bight and retraction of said detent portion from said formation.

6. The invention according to claim 5 wherein said grooves have flat bottoms and the bight and legs of said fastener have flat sides engaged with said flat bottoms.

7. The invention according to claim 5 wherein one end portion of said axial groove is curved upwardly and merges with the radial groove in one side surface of said hub.

8. The invention according to claim 7 wherein said upwardly curved portion is vertically aligned with said detent pin portion of said fastener to provide said clearance space.

9. A detent fastener according to claim 1 further characterized by a second detent pin portion laterally spaced from said first detent pin portion.

10. The detent fastener according to claim 9 wherein said detent pin portions each comprise a first part bent downwardly from an end of said bight portion and a second part bent upwardly from and upon said first part, and said leg portions are respectively upward extensions of said second parts of said respective detent pin portions.

11. A detent fastener according to claim 10 wherein each said leg portion has a fingergrip means at its upper end.

12. The invention according to claim 5 wherein said fastener is provided with a second detent pin portion laterally spaced from said first detent pin portion and said spindle is provided with a second detent receiving formation for receiving said second detent pin portion.

UNITED STATES PATENT OFFICE
CERTIFICATE OF CORRECTION

Patent No. 3,561,799　　　　　Dated　February 9, 1971

Inventor(s)　　　Francis M. Hutchinson

It is certified that error appears in the above-identified patent and that said Letters Patent are hereby corrected as shown below:

In the Abstract:

Line 2, after "as" insert -- a --

In the Specification:

Column 1, line 61, after "ing" insert

-- the wire downwardly from the bight portion and then bending --

Column 3, line 11, change "U-shap" to -- U-shape --

Signed and sealed this 29th day of June 1971.

(SEAL)
Attest:

EDWARD M. FLETCHER, JR.　　　　　WILLIAM E. SCHUYLER,
Attesting Officer　　　　　　　　Commissioner of Paten